United States Patent [19]

Weir

[11] Patent Number: 5,644,510

[45] Date of Patent: Jul. 1, 1997

[54] APPARATUS AND METHOD FOR MOTOR OVERLOAD PROTECTION USING AN ELAPSED-TIME SIGNAL FOR ENABLING COMPUTATION OF MOTOR TEMPERATURE DATA INDEPENDENTLY OF TEMPORARY POWER INTERRUPTION

[75] Inventor: Michael Paul Weir, Ballston Lake, N.Y.

[73] Assignee: General Electric Company, Schenectady, N.Y.

[21] Appl. No.: 344,912

[22] Filed: Nov. 25, 1994

[51] Int. Cl.⁶ .................................................. H02H 7/00
[52] U.S. Cl. .................. 364/557; 364/483; 364/571.03; 361/23; 361/24
[58] Field of Search ................................ 364/481, 483, 364/492, 569, 557, 571.01–571.08; 361/64, 31, 71, 37, 23, 24; 318/98, 783, 778

[56] References Cited

U.S. PATENT DOCUMENTS

| | | | |
|---|---|---|---|
| 4,597,025 | 6/1986 | Rutchik et al. | 361/94 |
| 4,616,324 | 10/1986 | Simmel | 364/483 |
| 5,101,315 | 3/1992 | Ishikawa et al. | 361/24 |
| 5,283,708 | 2/1994 | Waltz | 361/93 |
| 5,303,160 | 4/1994 | Winter et al. | 364/481 |
| 5,325,315 | 6/1994 | Engel et al. | 364/571.05 |
| 5,418,677 | 5/1995 | Engel | 361/25 |

*Primary Examiner*—Emanuel T. Voeltz
*Assistant Examiner*—Kamini S. Shah
*Attorney, Agent, or Firm*—Marvin Snyder

[57] ABSTRACT

Apparatus for electrically coupling a motor to a power source and providing overload protection to the motor includes a controller having a programmable module for periodically computing data indicative of motor temperature based upon motor current. The controller supplies an output signal based at least upon the computed motor temperature data. A contactor, responsive to the controller output signal, deenergizes the motor whenever any last-computed motor temperature data reaches or exceeds a threshold temperature. The last-computed motor temperature data is stored in a memory prior to the motor being deenergized. A signal from a timer circuit indicative of elapsed time after the motor is deenergized, together with the stored motor temperature data, enable the programmable module to compute fresh date indicative of motor temperature subsequent to the motor being deenergized. The programmable module, upon initialization with the fresh motor temperature data, can readily resume periodic computation of motor temperature data based upon current now drawn by the motor.

8 Claims, 5 Drawing Sheets

APPARATUS AND METHOD FOR MOTOR OVERLOAD PROTECTION USING AN ELAPSED-TIME SIGNAL FOR ENABLING COMPUTATION OF MOTOR TEMPERATURE DATA INDEPENDENTLY OF TEMPORARY POWER INTERRUPTION

BACKGROUND OF THE INVENTION

The present invention relates to apparatus and method for motor overload protection and, more particularly, to apparatus and method for motor overload protection which uses an elapsed time signal for enabling computation of motor temperature independently of any temporary power interruption.

Motor overload protection devices are employed for avoiding damage to electric motors during an overload condition. For instance, if the overload condition is left uncorrected, any current which substantially exceeds the ampere-rating of the motor can result in motor temperatures being sufficiently high for damaging or degrading winding insulation. This degradation can eventually cause electrical shorts in the windings of the motor and this, in turn, can ultimately lead to a catastrophic failure. However, motor overload protection devices proposed heretofore suffer from various significant disadvantages. For example, devices have been proposed which are controlled by a microprocessor. Although the microprocessor provides a greater flexibility in the control features of the overload protection device by modeling the thermal characteristics of the motor, such microprocessors must generally remain electrically powered, even when power is disconnected from the motor, in order to calculate the temperature of the motor. Thus, this type of continuously powered devices are vulnerable to any temporary power interruption since, as long as the microprocessor is unpowered, the microprocessor is simply unable to track any information indicative of motor cooling. This is particularly undesirable since the lack of such information essentially disables or prevents the microprocessor from accurately resuming computation of motor temperature once power is restored. Although schemes which employ battery backup and/or power backup capacitors may allow for the microprocessor to track or compute the thermal state of the motor based on its thermal characteristics when the main power source is interrupted, it will be appreciated that these schemes generally result in devices that are relatively expensive, bulky, complicated and generally require more software code due to their inherent complexity.

U.S. Pat. No. 5,303,160 proposes a scheme that somewhat improves the susceptibility of microprocessor-based devices to temporary power interruptions by using an external circuit, such as a resistance capacitance (RC) network having a generally fixed time constant, for storing an analog signal that mimics or is equivalent to the thermal characteristics, such as the $I^2_1$ heat measure, of a given motor. One disadvantage of this scheme is that use of an RC network to store an analog signal indicative of the motor's thermal characteristics requires different component values, such as the respective values for the capacitor and/or resistor which make up the RC network, for motors having different thermal characteristics. This follows since different time constants are required for modeling motors having different thermal characteristics. Thus, this scheme unfortunately results in a burdensome and costly proliferation of components and corresponding identifying catalog numbers for these components. Moreover, this proliferation of components and catalog numbers adds complexity and cost to field operations, such as maintenance and repairs. Another disadvantage in mimicking the thermal characteristics of the motor as a voltage being discharged from an RC network is that the transfer function of such network, in its simplest and most economical implementation, is limited to a plain exponential which may not be adequate for accurately modeling the relatively complex thermal characteristics of a given motor. Although some piecewise linear approximation can be achieved with more complex and costly discharge circuits, it will be apparent that none of the respective transfer functions of these analog circuits may accurately match, as suggested above, the relatively complex thermal characteristics of a given motor. Thus, it is desirable to provide a method and apparatus which advantageously and at relatively low cost overcomes the above-listed disadvantages.

SUMMARY OF THE INVENTION

Generally speaking, the present invention fulfills the foregoing needs by providing apparatus for electrically coupling a motor to a power source and providing overload protection to the motor. The apparatus comprises a controller having a programmable module for periodically computing data indicative of motor temperature based upon current supplied by the power source to the motor. The controller is designed to supply a controller output signal based at least upon the computed motor temperature data. Switching means, such as a contactor, is responsive to the controller output signal for deenergizing the motor whenever any last-computed motor temperature data at least reaches a predetermined threshold temperature. A memory, such as a nonvolatile memory, is employed for storing the last-computed motor temperature data prior to the motor being deenergized. A timer circuit is coupled to the controller to supply a timer output signal indicative of elapsed time upon the motor being deenergized. The supplied timer output signal and the stored motor temperature data enables the programmable module to compute, independently of any temporary electrical power interruption therein, fresh data indicative of motor temperature subsequent to the motor being deenergized. Means for initializing the programmable module with the fresh motor temperature data allows the programmable module for resuming periodic computation of data indicative of motor temperature based upon current supplied by the power source to the motor subsequent to the motor being reenergized.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like numbers represent like parts throughout the drawings, and in which:

DETAILED DESCRIPTION OF THE INVENTION

Figure 1:
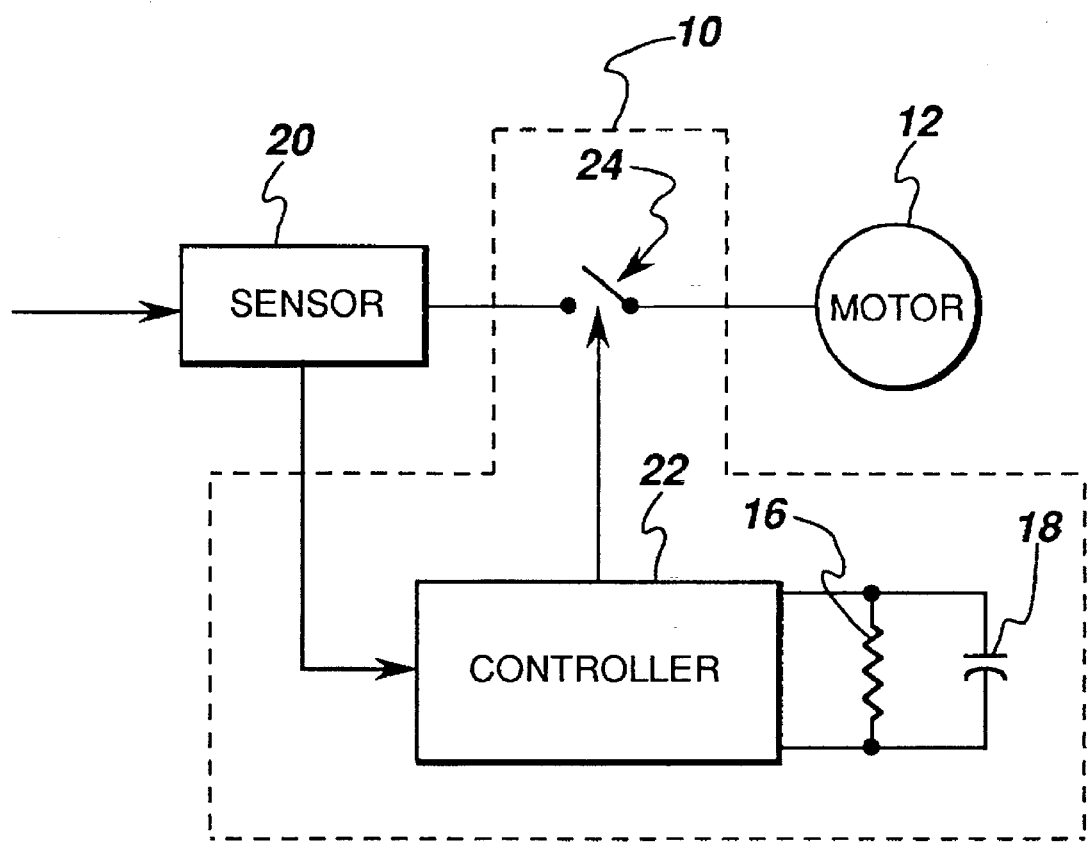
FIG. 1 shows a generally block diagram schematic of a prior art device for motor overload protection.

FIG. 1 shows a prior art device 10 for controlling an electrical load, such as a motor 12. Device 10 includes an RC network made up of a leakage resistor 16 and a capacitor 18 for storing an analog signal equivalent to a digitally modeled representation for the specific thermal characteristics of motor 12. In operation, the analog signal stored in capacitor 18 decays by discharging through leakage resistor 16 at a rate which mimics the cooling rate of motor 12. A sensor 20, such as a current transformer, provides to a controller 22 an output signal indicative of the magnitude or level of current being supplied to motor 12 for allowing controller 22 to compute or calculate the temperature of the motor. This calculated temperature value is compared with a selected trip or threshold value. If the trip value is exceeded, a controller output signal causes a contactor 24 to open and interrupt current to motor 12. Typically, controller 22 is powered up by the same line which supplies current to the motor and thus when the motor is deenergized so is controller 22. As previously suggested, in order to maintain the thermal characteristics when controller 22 is deenergized, an analog signal representative of the specific thermal characteristics of motor 12 is stored in capacitor 18. Although this scheme is somewhat helpful for maintaining the thermal characteristics of the motor independently of any temporary power interruption, it will be appreciated that this scheme suffers from the various disadvantages discussed above, such as proliferation of components and a generally inaccurate match between the actual thermal characteristics of the motor and the transfer function of the RC network.

Figure 2:
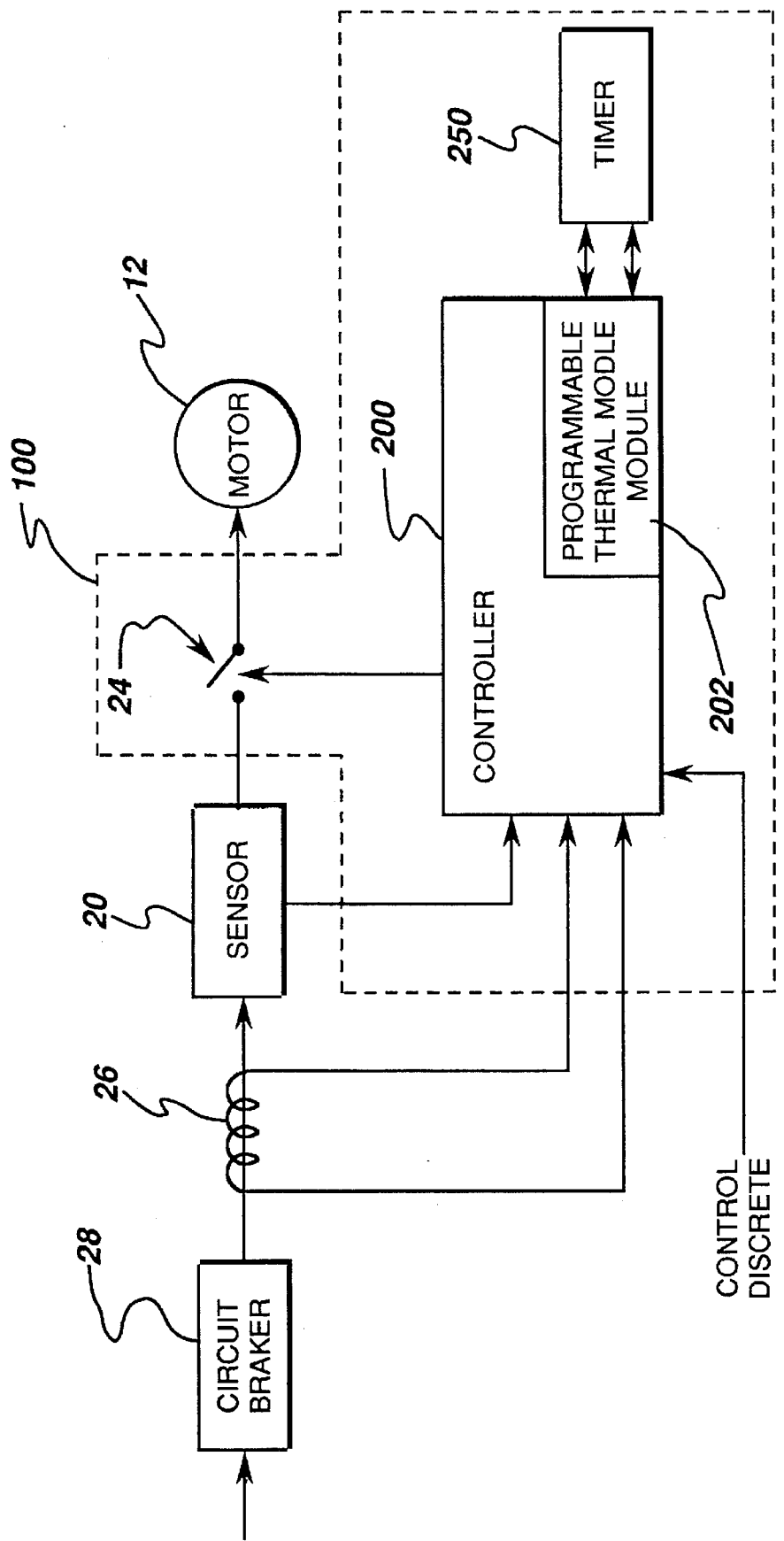
FIG. 2 shows a generally block diagram schematic of an exemplary embodiment of apparatus for motor overload protection including a controller and a timer circuit in accordance with the present invention.
Figure 3:
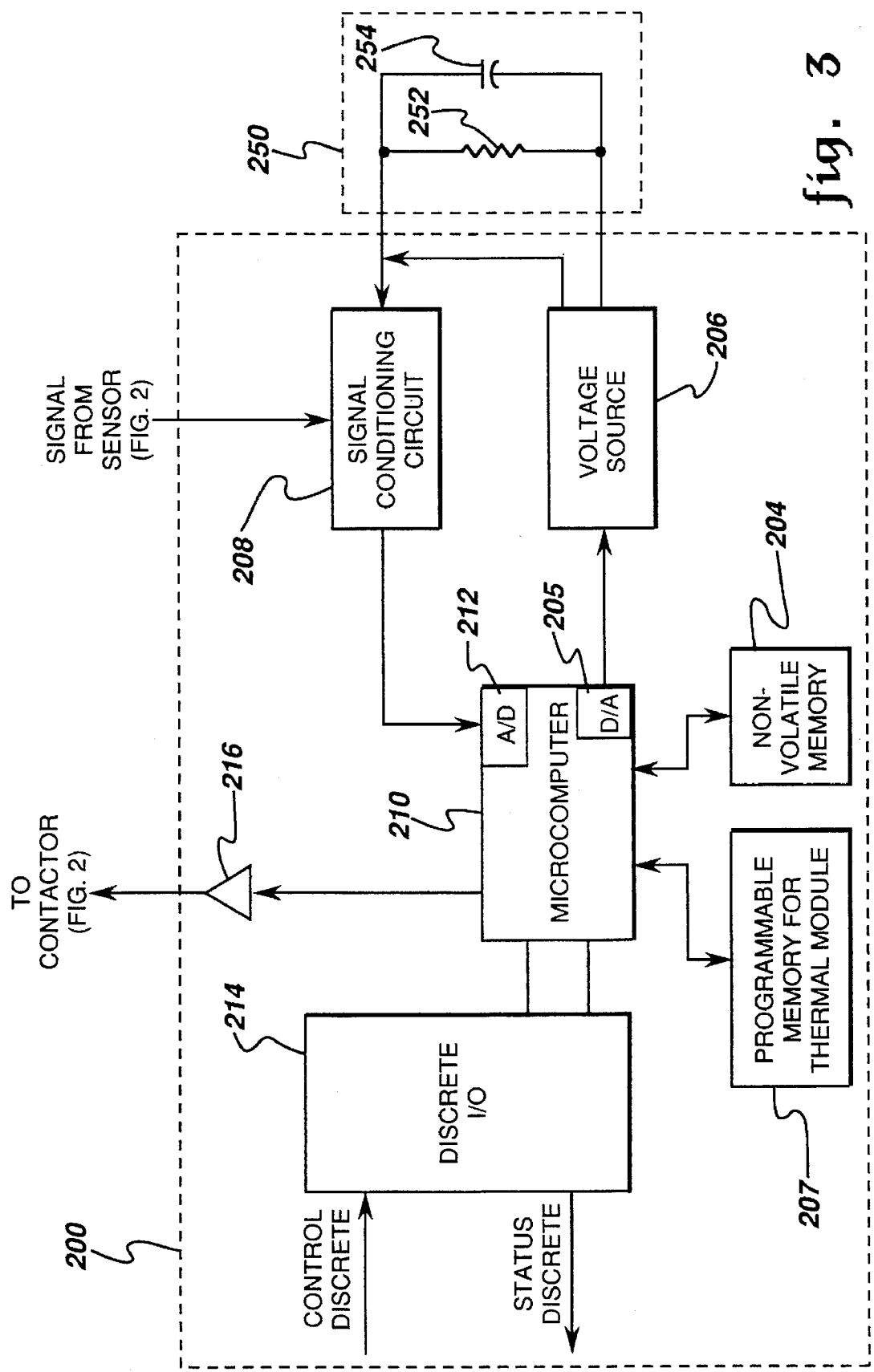
FIG. 3 shows further details about the controller and timer circuit shown in FIG. 2.

FIG. 2 shows an apparatus 100 in accordance with the present invention for electrically coupling motor 12 to a power source (not shown) and providing overload protection to motor 12. A controller 200 has a programmable module 202 for periodically computing or calculating data indicative of motor temperature based, for example, upon current supplied by the power source to motor 12. As suggested above, sensor 20 can be used for sensing or measuring the level of current being supplied by the power source to motor 12. For the sake of simplicity of illustration, only one sensor 20 is shown in FIG. 2, however, it will be appreciated that each of the three supply lines in a three-phase motor is individually monitored by a respective current sensor. Controller 200 is designed to supply a controller output signal, such as a bilevel output signal, based at least upon the computed motor temperature data. Switching means, such as contactor 24, is responsive, for example, to a respective one of the two levels of the controller output signal for deenergizing motor 12 whenever any last-computed motor temperature data at least reaches or exceeds a predetermined threshold temperature. It will be appreciated that the controller output signal need not be exclusively based upon the periodically computed motor temperature data, since the controller output signal can be additionally based, for example, on the level of an externally derived control discrete signal being applied to controller 200 for commanding precautionary trips independent of motor temperature. As shown in FIG. 2, a step-down transformer 26 can be electromagnetically coupled to one of the lines that carries motor current for generating a predetermined level of electrical current being sufficiently low for safely powering controller 200. As will be appreciated by those skilled in the art, it is typical to provide one or more line protective devices, such as circuit breaker 28, upstream of both motor-protecting apparatus 100 and motor 12. In particular, any faults that cause circuit breaker 28 to be electrically open will thus cause electrical power interruption to both motor 12 and apparatus 100. As will be explained shortly hereafter, the present invention advantageously allows for economically and accurately providing motor overload protection by employing an elapsed time signal for enabling computation of motor temperature data independently of any temporary power interruption As shown in FIG. 3, a memory 204 made up of nonvolatile memory, such as an Electrically Erasable Programmable Read-Only-Memory (EEPROM) or a suitable flash semiconductor memory, is employed for storing the last-computed motor temperature data prior to motor 12 and controller 200 being deenergized as a result of a temporary power interruption. As used herein the expression "temporary power interruption" refers to momentary electrical power interruption in both the motor protecting apparatus and the motor. The temporary power interruption, for example, may be due to faults in circuit breaker 28 (FIG. 2).

As shown in FIGS. 2 and 3, a timer circuit 250 is coupled to controller 200 to supply a timer output signal indicative of elapsed time upon motor 12 being deenergized, i.e., elapsed time since motor 12 and controller 200 were both deenergized as a result of the temporary power interruption. It will be appreciated that the supplied timer output signal and the stored motor temperature data advantageously enable programmable module 202 to compute, independently of any temporary electrical power interruption therein, fresh data indicative of motor temperature subsequent to motor 12 being deenergized, i.e., the fresh data accurately reflects or takes into account motor cooling occurring during the elapsed time. Initializing means, such as a microcomputer 210 shown in FIG. 3, enables programmable module 202 to be initialized with the fresh temperature data upon power being restored in controller 200. That is, microcomputer 210 can be readily programmed to issue an initialization instruction upon power being restored in controller 200. This allows programmable module 202 to accurately resumed periodic computation of data indicative of motor temperature data based on current supplied by the power source to motor 12 subsequent to motor 12 being reenergized. Motor 12 can be conveniently reenergized when contactor 24 receives the other of the two levels of the controller output signal. It will be appreciated that motor reenergization can be conveniently implemented at any desired time subsequent to the controller having been reinitialized with fresh motor temperature data.

FIG. 3 shows further details about controller 200 and timer circuit 250. As shown in FIG. 3, by way of example, timer circuit 250 preferably comprises an RC network made up of a leakage resistor 252 and a timing capacitor 254 electrically coupled in parallel to one another. However, it will be appreciated that a relatively low-current (e.g., on the order of about a few µA or lower) digital clock module having a suitable and inexpensive backup cell could alternatively provide the elapsed time signal. In the RC network of the present invention, the voltage signal stored on capacitor 254 is advantageously employed only for measuring elapsed time, that is, to measure how long motor 12 and controller 200 have been without electrical power. For example, a microcomputer-controlled voltage source 206 can be readily employed for charging timing capacitor 254 to a predetermined voltage level just prior to electrical power being temporarily lost or interrupted. For example, microcomputer 210 can issue a signal, which after suitable digital-to-analog conversion in converter 205, is passed to voltage source 206 for charging timing capacitor 254 at the predetermined voltage level.

When electrical power is restored in controller 200, voltage across capacitor 254 can be supplied for measurement to a signal conditioning circuit 208 and, after suitable conversion by a analog-to-digital converter 212, microcomputer 210 can in turn compute the elapsed time by solving, for example, a differential equation for the timer circuit. As will be apparent to those skilled in the art, for the RC network shown in FIG. 3, the differential equation corresponds to a logarithmic function. Since the last-computed motor temperature data obtained prior to the temporary power loss is stored in nonvolatile memory 204, the thermal model module for the motor can then compute fresh motor temperature data as a function of the elapsed time and the last-computed motor temperature data. Thermal model module may comprise a programmable memory 207 having sufficient storage for digitally storing the thermal model, such as transcendentally derived equations, for any given motor. Programmable memory 207 may comprise programmable memories such as Erasable Programmable Read-Only-Memory (EPROM), Electrically Erasable Programmable Read-Only-Memory (EEPROM), flash memory, Programmable Read-Only-Memory (PROM) and the like.

It will be appreciated that in operation the present invention provides significant advantages over the prior art. For example, the specific thermal model of the thermal characteristics of any given motor is digitally stored in programmable memory 207 and not in an analog circuit, which at best may only provide a relatively crude approximation to the actual thermal characteristics of the motor. In the present invention, the RC network is conveniently used only for measuring elapsed time which is a relatively straightforward parameter to model, as compared to the relatively complex thermal characteristics of the motor. A discrete I/O module 214 can be used for providing various discrete signals, such as control and status discretes and other discrete signals, to and/or from microcomputer 210. For example and as previously suggested, the control discrete signal can conveniently allow for performing predetermined motor interruptions by opening and closing the contactor independently of any overload condition while the status discrete signal could be employed for indicating the operational status of the controller. A suitable amplifier 216 can be used for providing any suitable amplification to the controller output signal which actuates contactor 24 (FIG. 2) as described above.

Figure 4:
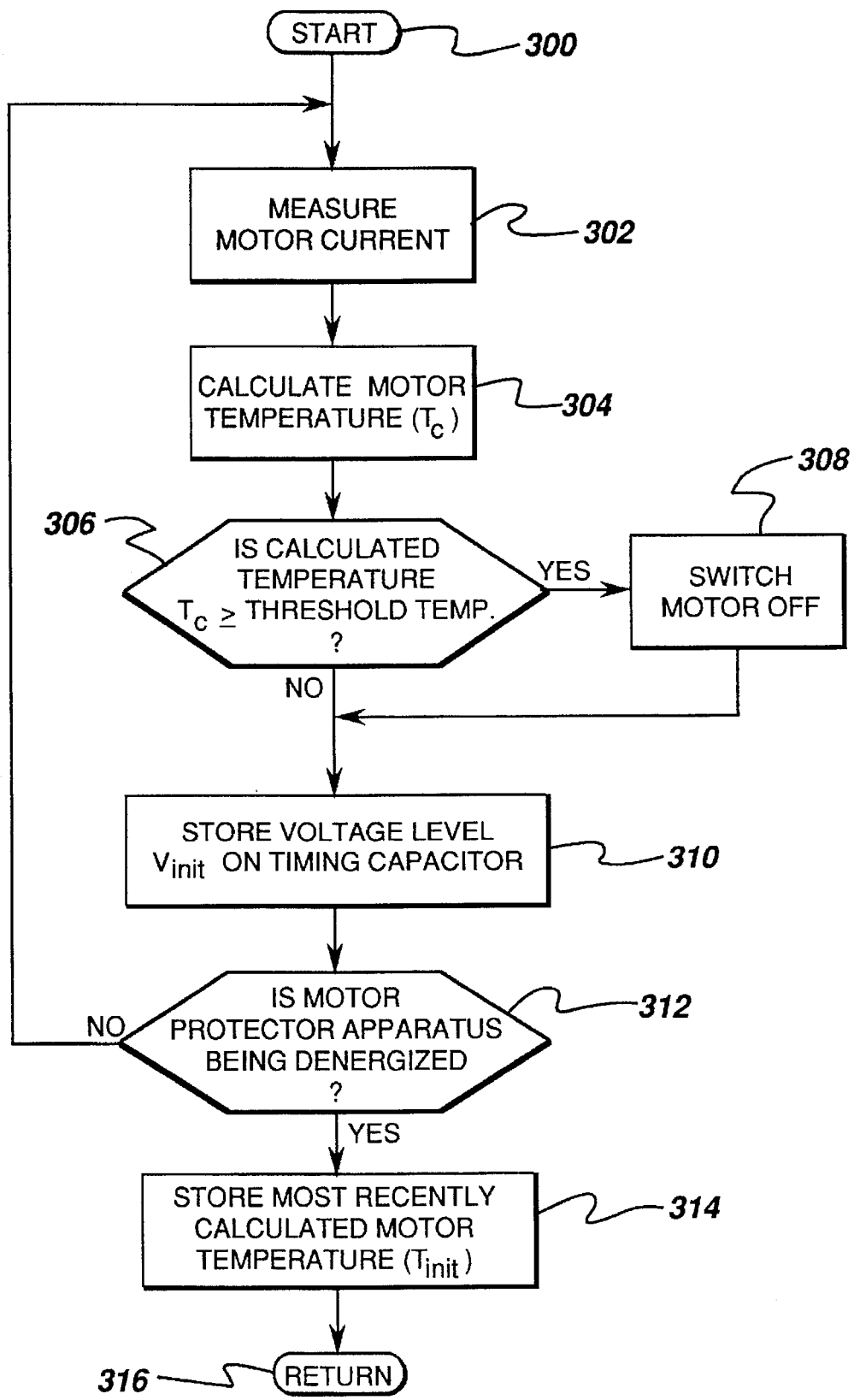
FIG. 4 is a flowchart illustrating a sequence of steps for computing motor temperature prior to a temporary power interruption in accordance with the present invention.

FIG. 4 illustrates a sequence of method steps which can be conveniently implemented for electrically coupling a motor to a power source and providing overload protection to the motor independently of any temporary power interruption therein. In particular, the sequence of steps shown in FIG. 4 can be conveniently performed prior to any such temporary power interruption. Subsequent to start of operations, as indicated in step 300, a sensor can be used for measuring motor current in step 302. In step 304, data indicative of motor temperature can be periodically calculated based upon the measured current by using a thermal model for the motor. The thermal model can be digitally stored in a programmable memory. As shown in steps 306 and 308, the motor is deenergized whenever any last-computed motor temperature data at least reaches or exceeds a predetermined threshold temperature. In any event, a storing step 310 allows for storing a predetermined voltage level ($V_{init}$) on a timing capacitor. If in step 312 the motor protecting apparatus is being deenergized, a storing step 314 allows for storing the last-calculated motor temperature in a nonvolatile memory. Conversely, if the motor protecting apparatus remains electrically powered, the sequence of steps is repeated as shown in FIG. 4 and as described above.

Figure 5:
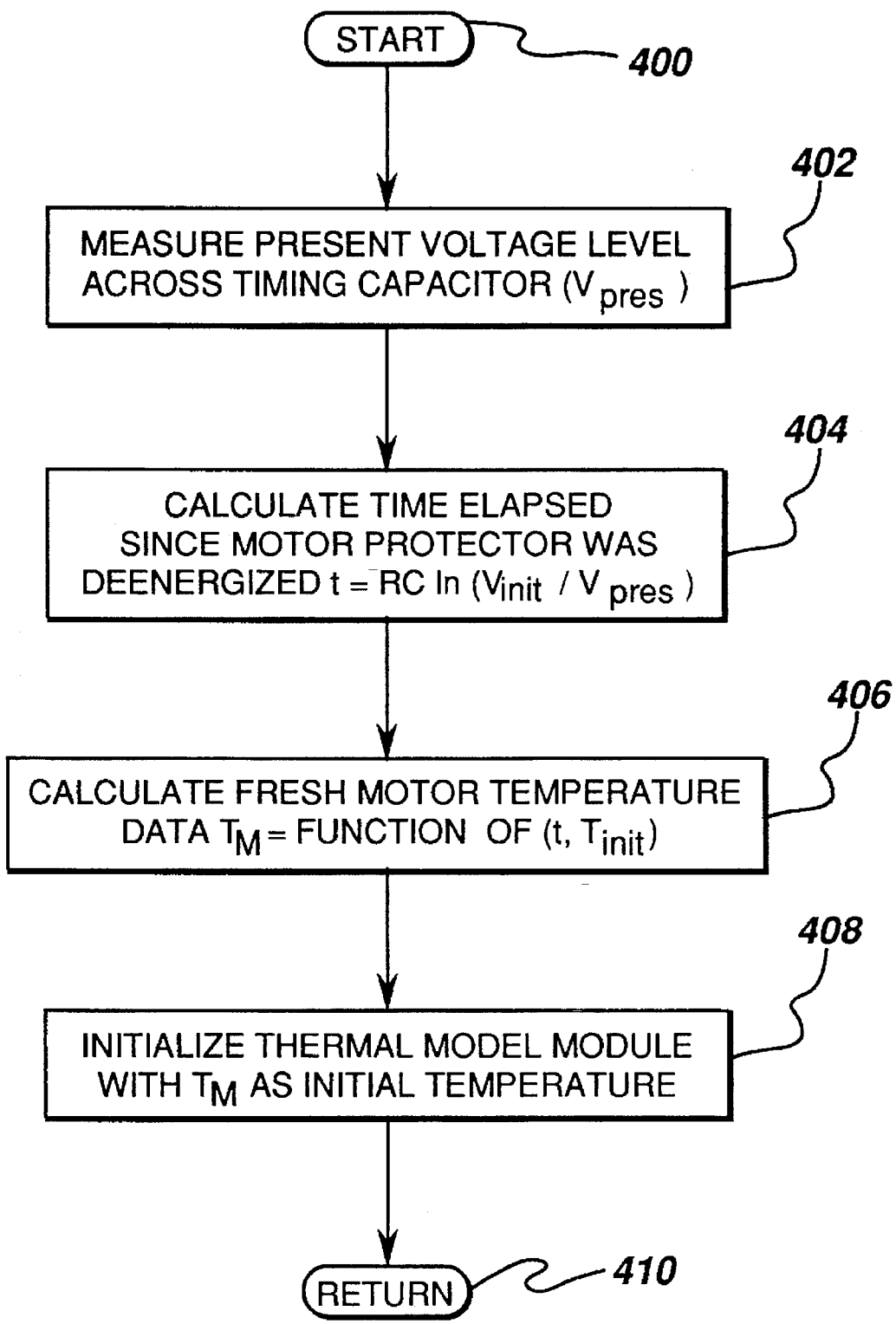
FIG. 5 is a flowchart illustrating a sequence of steps for resuming computation of motor temperature subsequent to a temporary power interruption in accordance with the present invention.

FIG. 5 illustrates a sequence of method steps which can be conveniently implemented when electrical power is restored subsequent to a momentary power interruption. After start of operations in step 400, measuring step 402 allows for measuring the present voltage level ($V_{pres}$) across the timing capacitor. Step 404 allows for calculating time elapsed since the motor protecting apparatus and motor were respectively deenergized. For example, the calculation can be performed in accordance with the following equation:

$$t = RC \ln [V_{init}/V_{pres}] \qquad \text{Eq. 1,}$$

wherein t represents time elapsed, R is the resistance value of the leakage resistor and C is the capacitance of the timing capacitor. Step 406 allows for computing, based upon the stored motor temperature data and the calculated elapsed time, fresh data indicative of motor temperature subsequent to the motor being deenergized. Thus, in accordance with the thermal characteristics of the motor and by taking into account the elapsed time as well as the last-calculated motor temperature prior to motor deenergization, the fresh data accurately reflects any motor cooling having occurred during the time elapsed subsequent to the motor having been deenergized. Step 408 conveniently allows for initializing the thermal model module with the fresh data being used as the initial temperature. Return step 410 conveniently completes the sequence of steps subsequent to power having been restored in the motor protecting apparatus. At this point, computation of motor temperature data based upon current measurements subsequent to the motor being reenergized can be conveniently resumed as discussed in the context of FIG. 4.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. Apparatus for electrically coupling a motor to a power source and providing overload protection to said motor, said apparatus comprising:

a controller having a programmable module for periodically computing digital data indicative of motor temperature based upon current supplied by said power source to said motor, said controller being adapted to supply a controller output signal based at least upon the computed motor temperature data;

switching means responsive to the controller output signal for deenergizing said motor whenever any last-computed motor temperature data at least reaches a predetermined threshold temperature;

a nonvolatile memory for storing the last-computed motor temperature data prior to said motor being deenergized; and a timer circuit coupled to said controller to supply as an analog quantity a timer output signal indicative of elapsed time upon said motor being deenergized, the supplied timer output signal and the stored motor temperature data enabling said programmable module to compute, independently of any temporary electrical power interruption therein, fresh data indicative of motor temperature subsequent to said motor being deenergized; and means for initializing said programmable module with the fresh motor temperature data, thereby allowing said programmable module to resume periodic computation of digital data indicative of motor temperature based upon current supplied by said power source to said motor subsequent to said motor being deenergized.

2. The apparatus of claim 1 wherein said timer circuit comprises a resistance capacitance network.

3. The apparatus of claim 2 wherein said resistance capacitance network comprises a resistor and a capacitor coupled in parallel to one another.

4. The apparatus of claim 2 wherein said switching means comprises a contactor.

5. The apparatus of claim 4 wherein said nonvolatile memory for storing the last-computed motor temperature data comprises a nonvolatile memory selected from the group consisting of Electrically Erasable Programmable Read-Only-Memory (EEPROM) and flash memory nonvolatile memories.

6. The apparatus claim 4 wherein said programmable module comprises a programmable memory selected from the group consisting of Erasable Programmable Read-Only-Memory (EPROM), Electrically Erasable Programmable Read-Only-Memory (EEPROM), flash memory, and Programmable Read-Only-Memory (PROM) programmable memories.

7. The apparatus of claim 4 wherein said initializing means comprises a microcomputer.

8. A method for electrically coupling a motor to a power source and providing overload protection to said motor independently of any temporary power interruption therein, said method comprising:

measuring current supplied by said power source to said motor;

digitally computing, periodically, data indicative of motor temperature based upon the measured current;

deenergizing said motor whenever any last-computed motor temperature data at least reaches a predetermined threshold temperature;

storing, in a nonvolatile memory, the last-computed motor temperature data prior to said motor being deenergized;

measuring elapsed time as a capacitive discharge through a resistance capacitance network upon said motor being deenergized;

digitally computing, based upon the stored motor temperature data and the measured elapsed time, fresh data indicative of motor temperature subsequent to said motor being deenergized; and resuming periodic digital computation of motor temperature data based upon said fresh data and current measurements subsequent to said motor being energized.

* * * * *